No. 631,075. Patented Aug. 15, 1899.
A. E. HINMAN.
SHIPPING CRATE.
(Application filed Mar. 11, 1899.)
(No Model.)
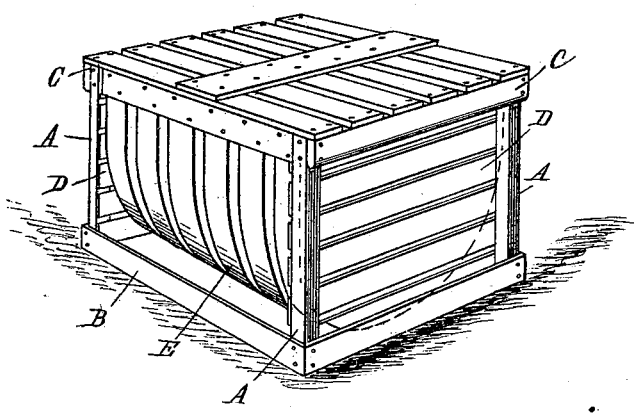
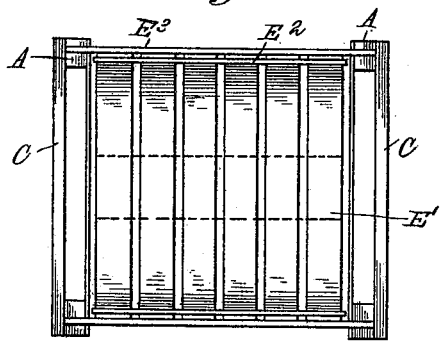
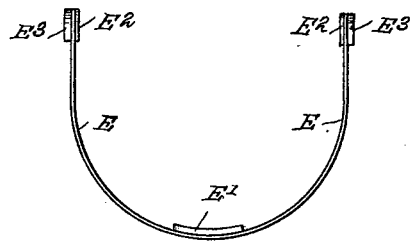
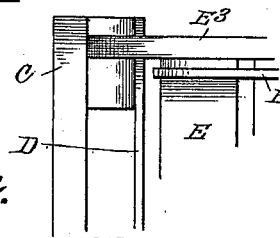
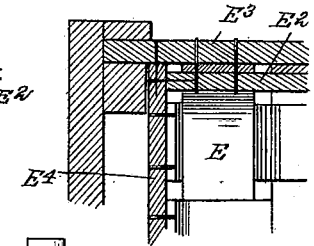
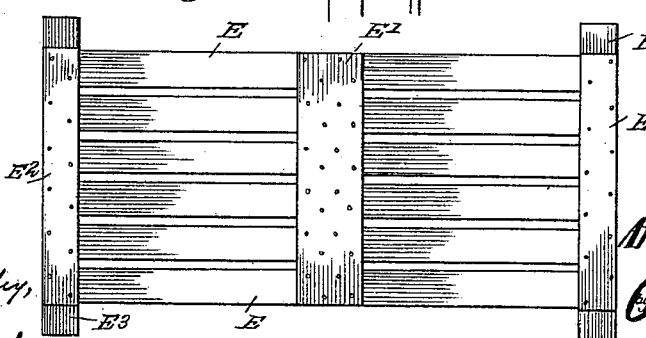
Inventor
Arthur E. Hinman
Witnesses

UNITED STATES PATENT OFFICE.

ARTHUR E. HINMAN, OF SPARTA, MICHIGAN.

SHIPPING-CRATE.

SPECIFICATION forming part of Letters Patent No. 631,075, dated August 15, 1899.

Application filed March 11, 1899. Serial No. 708,732. (No model.)

*To all whom it may concern:*

Be it known that I, ARTHUR E. HINMAN, a citizen of the United States, residing at Sparta, in the county of Kent and State of Michigan, have invented a new and useful Shipping-Crate, of which the following is a specification.

This invention is a new and useful construction of shipping-crate particularly adapted for shipping fruits, the object being to provide a form of crate in which the fruit can be carried without injury from jarring and at the same time will be perfectly ventilated.

With these objects in view my invention consists, essentially, in providing a rigid supporting-frame for the purpose of supporting and containing a flexible basket or receptacle in which the fruit is carried, said basket or receptacle having a limited movement within the rigid frame, thereby taking up any shock and preventing one basket or box of fruit knocking against another.

The invention consists also in certain details of construction and novelties of combination or arrangement, all of which will be fully described, and pointed out in the claims.

In the drawings, Figure 1 is a view of a crate constructed in accordance with my invention. Fig. 2 is a top plan view looking into the crate, the top being removed. Fig. 3 is an end view of the receptacle bent ready to fit within the rigid frame. Fig. 4 is a plan view of the flexible receptacle before being bent. Fig. 5 is an enlarged top plan view of one corner of the crate. Fig. 6 is an enlarged view showing in sections a slightly-modified form of construction.

In constructing a crate in accordance with my invention I employ two end posts A, which are connected by means of the bottom strips B and the end strips C at the upper ends. A series of end slats D also connect the corner-posts upon the other side, as most clearly shown in Figs. 1 and 2.

The inner receptacle for carrying the fruit is composed of a series of flexible wooden strips E, arranged parallel, as shown, and connected centrally by means of a cross-strip $E'$. The ends of said strips are fastened between the inner cross-strip $E^2$ and the outer cross-strip $E^3$, the outer strip being longer than the inner strip, as shown in Fig. 4, whereby the receptacle is fastened within the rigid frame, a corner-post being slitted vertically to receive the projecting ends of the end strips $E^3$, thereby forming a rest or support for the inner receptacle after the strips have been bent, as shown in Fig. 3. By suspending the inner receptacle in this manner or by constructing the same of flexible strips it will be clearly understood that the said inner receptacle may have a certain limited movement within the frame, inasmuch as it does not extend to the bottom of said frame and is therefore free to swing back and forth within the same, and in this manner it will take up the jar to which the crate is subjected, and thus save the fruit from injury.

It will thus be seen that I provide an exceedingly cheap, simple, and convenient construction and ventilating shipping-crate, thereby saving the fruit contained within the inner receptacle from damage.

The cover can be constructed in any suitable manner. I prefer to construct the same of slats, as most clearly shown in Fig. 1.

Having thus fully described my invention, what I claim as new, and desire to secure by Letters Patent of the United States, is—

1. In a shipping-crate the combination with a rigid frame comprising a series of flexible strips connected at their ends by cross-strips, said cross-strips being adapted to fit in the slits of the corner-posts, the end slats connecting the corner-posts and forming the ends of the inner receptacle, substantially as shown and described.

2. In a shipping-crate the combination with a rigid frame, of a series of flexible strips U-shaped in cross-section connected at their ends by cross-strips $E^2$ and E and transverse strips extending across the end of the rigid frame and the end U-shaped strips, substantially as described.

3. In a shipping-crate the combination with a rigid frame of a series of flexible strips connected at their ends to the cross-strips $E^2$ and $E^3$ whereby a swinging flexible receptacle is formed U-shaped in cross-section and flexible strips extending across the ends of the rigid frame and U-shaped receptacle, said cross-strips adapted to fit in the slits of the corner-posts, substantially as described.

ARTHUR E. HINMAN.

Witnesses:
J. W. HALLACK,
FRANK W. PURDY.